C. G. SCHULZ AND A. J. CROLL.
METHOD OF FORMING FIELD WINDINGS.
APPLICATION FILED NOV. 24, 1919.
1,406,092. Patented Feb. 7, 1922.
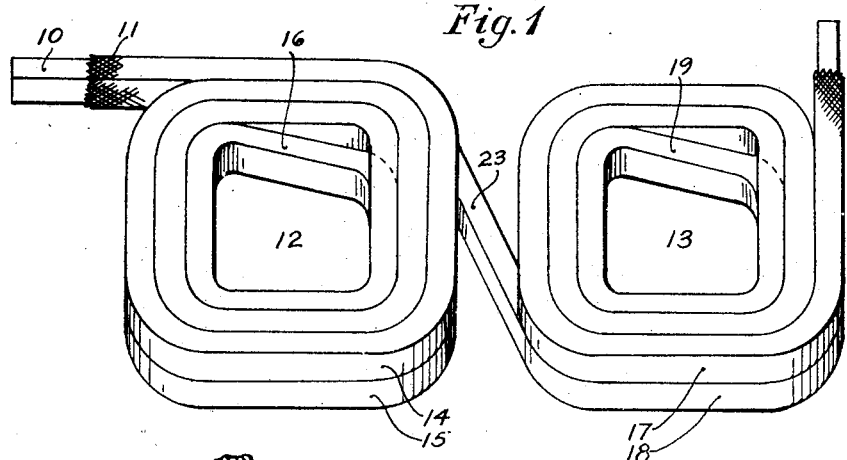
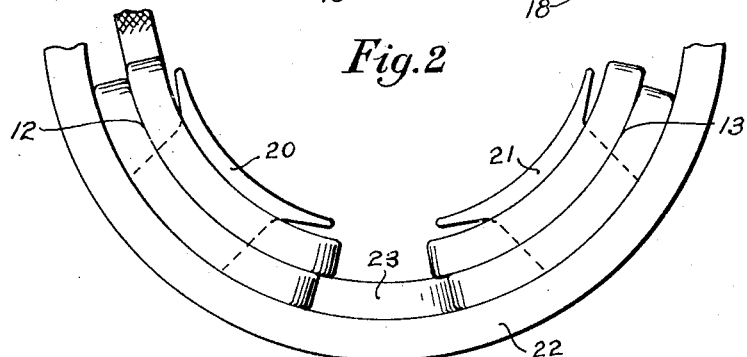
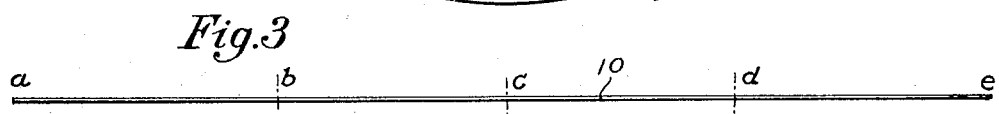
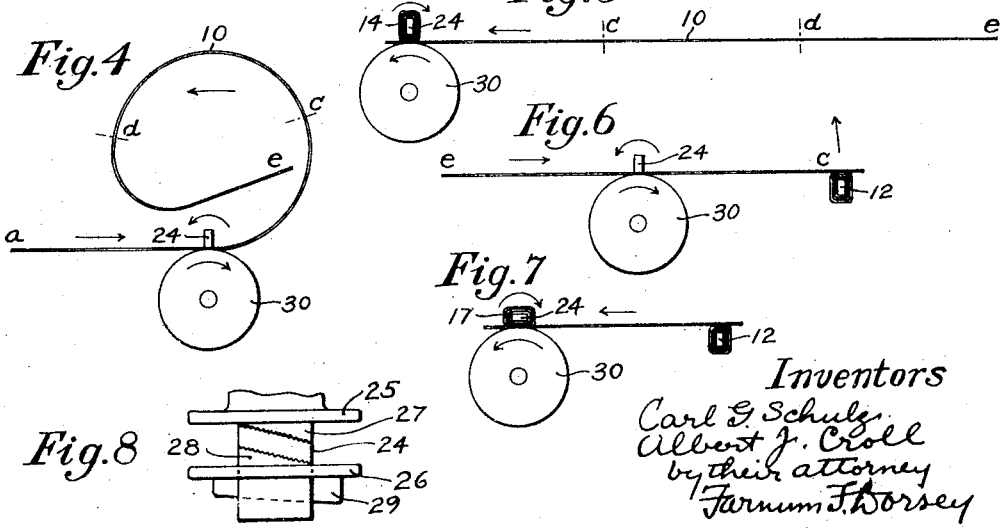
Inventors
Carl G. Schulz
Albert J. Croll
by their attorney
Farnum F. Dorsey

UNITED STATES PATENT OFFICE.

CARL G. SCHULZ AND ALBERT J. CROLL, OF ROCHESTER, NEW YORK, ASSIGNORS TO NORTH EAST ELECTRIC COMPANY, OF ROCHESTER, NEW YORK, A CORPORATION OF NEW YORK.

METHOD OF FORMING FIELD WINDINGS.

1,406,092.     Specification of Letters Patent.      Patented Feb. 7, 1922.

Application filed November 24, 1919. Serial No. 340,385.

*To all whom it may concern:*

Be it known that we, CARL G. SCHULZ and ALBERT J. CROLL, citizens of the United States, residing at Rochester, in the county of Monroe and State of New York, have invented certain new and useful Improvements in Methods of Forming Field Windings; and we do hereby declare the following to be a full, clear, and exact description of the invention, such as will enable others skilled in the art to which it appertains to make and use the same.

This invention relates to the field-windings of electric motors and generators.

It is common to provide two poles of the field-magnet of a motor or generator with coils which are connected together in series. In some instances these coils are formed of a ribbon-like conductor which is wound edgewise in a single layer, and in such cases the two coils have sometimes been made of a single integral length of conductor. But where the coils have been wound in the ordinary manner, with a plurality of layers, they have usually been made separately and then connected together by soldering or otherwise.

The object of the present invention is to produce, by a simple operation, a field-winding comprising two coils each consisting of a plurality of layers, and to form this winding from a single integral length of conductor, so as to avoid the expense and the weakness involved in the formation of a joint between the coils.

To the foregoing end the invention consists in the method of forming a field-winding which is hereinafter described and is illustrated in the accompanying drawings, as defined in the appended claims and without limitation to the specific details of the description and drawings.

In the accompanying drawings Fig. 1 is a front-view of a field-winding embodying the present invention, shown as inclined at an angle to the horizontal. Fig. 2 is a partial end-view of a field magnet to which the winding of Fig. 1 has been applied. Fig. 3 is a side-elevation of the single integral length of conductor from which the winding is formed. Figs. 4, 5, 6, and 7 are diagrammatic views showing several stages in the operation of forming the winding. Fig. 8 is a plan-view showing certain details of the mandrel upon which the winding is formed.

The invention is illustrated as embodied in a field-winding of comparatively few turns, adapted for use on a four-pole motor or generator. As shown in Figs. 1 and 2 it comprises two coils 12 and 13, each consisting of two layers. A feature of the present invention resides in the fact that these layers are both wound in substantially the form of a volute or flat spiral, except as modified to suit the generally rectangular section of the pole-pieces on which the coils are to be used, this form and arrangement of the layers lending itself, as will be made apparent hereafter, to the production of a winding from a single integral conductor.

The conductor 10, from which the coils 12 and 13 are formed, is of substantially rectangular form in cross-section, and is provided with an insulating cover or sleeving 11 of suitable material. The inner terminals of the two layers 14 and 15 of the coil 12 are connected by an inclined portion 16, while the layers 17 and 18 of the coil 13 are similarly connected by an inclined portion 19. The two coils are connected together by a portion 23 of the conductor constituting the terminals of the two corresponding layers 15 and 18 of the two coils, and this connection 23 is in S form, as shown in Fig. 1, so that the current will flow through the two coils in opposite senses, as is necessary for the two adjacent poles of an ordinary four-pole motor or generator.

In Fig. 2 the winding of Fig. 1 is shown in position for use in a motor or generator having a field-frame or shell 22 from which two polar projections 20 and 21 extend, the coils 12 and 13 being mounted upon these respective projections.

The method of forming the winding just described is illustrated diagrammatically in Figs. 3 to 7. The conductor 10 is cut approximately to the required length, and for the purposes of description this conductor may be considered as divided into four approximately equal portions at the points $b$, $c$, and $d$, the points $b$ and $d$ being what are hereinafter referred to as "quarter-points."

The coils are wound upon a mandrel 24 of suitable rectangular section, and this mandrel is provided with flanges 25 and 26 spaced apart sufficiently to receive two layers of the conductor. The two flanges are provided with opposed jaws 27 and 28, respectively, which are serrated and are arranged to grip the conductor and hold it to the mandrel during the winding operation. These jaws engage the portions of the conductor which correspond to the parts 16 and 19 shown in Fig. 1, and the faces of the jaws are inclined to produce the offsetting necessary to align these two parts with the two layers which proceed therefrom. The flange 26 is removable from the mandrel, in order to permit the removal of the finished coil, and it is held in place by a wedge 29, this wedge serving also to force the flange 26 toward the flange 25, and thus cause the jaws to grip the conductor firmly.

The roller 30 is arranged to co-operate with the mandrel, to press the conductor firmly against the mandrel during the winding operation.

The preferred method of forming the winding upon the mandrel just described is to first seize and grip the conductor between the jaws 27 and 28, at the first quarter-point $b$, and then to form the first layer by winding the part $a-b$ of the conductor upon the mandrel, this being accomplished by rotation of the mandrel. Prior to this operation the remaining portion $b-e$ of the conductor is formed into one or more large coils as shown in Fig. 4, so that it may be revolved bodily around the mandrel to conform to the rotation thereof and not be wound thereon.

After the formation of the first layer, corresponding to the layer 14 of Fig. 1, in the manner just described, the second layer is formed by reversing the direction of rotation of the mandrel and shifting the pressure-roller 30 so as to engage the body-portion of the conductor. During the second operation the conductor is fed straight to the mandrel between the points $b$ and $c$, as shown in Fig. 5, while the layer 14, already formed, rotates upon and with the mandrel, the second layer 15 being wound in the space between the layer 14 and the flange 26.

After the first half of the conductor has been wound into the two layers constituting one of the coils, the conductor is disengaged from the mandrel and its position reversed end for end, and the operations already described are repeated, commencing at the quarter-point $d$, and winding from this point first to the end $e$, and then to the middle point $c$, as shown in Figs. 6 and 7 respectively. While winding from $d$ to $e$, as in Fig. 6, the part $c-d$ of the conductor, and the coil 12 already formed, revolve around and with the mandrel; while during the winding of the last coil 18, which is formed by the part $c-d$ of the conductor, the conductor is fed straight to the mandrel, while the layer 17 revolves upon and with the mandrel.

The invention claimed is:

1. The method of making a field-winding from a continuous integral conductor, which comprises: winding the conductor into a volute layer from one quarter-point towards one end; winding a second volute layer from said point towards the middle of the conductor; winding a third volute layer from the other quarter-point towards the other end; and winding a fourth volute layer from the same quarter-point towards the middle of the conductor.

2. The method of making a field-winding from a continuous integral conductor, which comprises: grasping the conductor at one quarter-point; rotating the part so grasped so as to wind two volute layers from said point towards the middle and the end, respectively, of the conductor; then grasping the conductor at the other quarter-point and winding two more similar layers in the same manner.

3. The method of forming a field-winding from a continuous integral conductor, which comprises: winding, on a rotating mandrel, two volute layers connected at the inside, from one half of the conductor, and revolving the second half of the conductor with the mandrel during the winding of that one of said layers which terminates at the end of the conductor; then winding two more layers, in a similar manner, from the other half of the conductor.

4. The method of forming a field-winding from a continuous integral conductor, which comprises: attaching the conductor to a mandrel at one quarter-point; rotating the mandrel in a direction to wind a volute layer of the conductor towards the adjacent end thereof, the part of the conductor which is being wound being fed directly to the mandrel while the rest of the conductor revolves about the mandrel; rotating the mandrel in the opposite direction so as to wind a second layer toward the middle of the conductor, the conductor being fed directly to the mandrel during this operation; and then winding two layers in a similar manner from the other half of the conductor.

CARL G. SCHULZ,
ALBERT J. CROLL.